David Carl Larson INVENTOR

BY *Walter T. Bradley* ATTORNEY

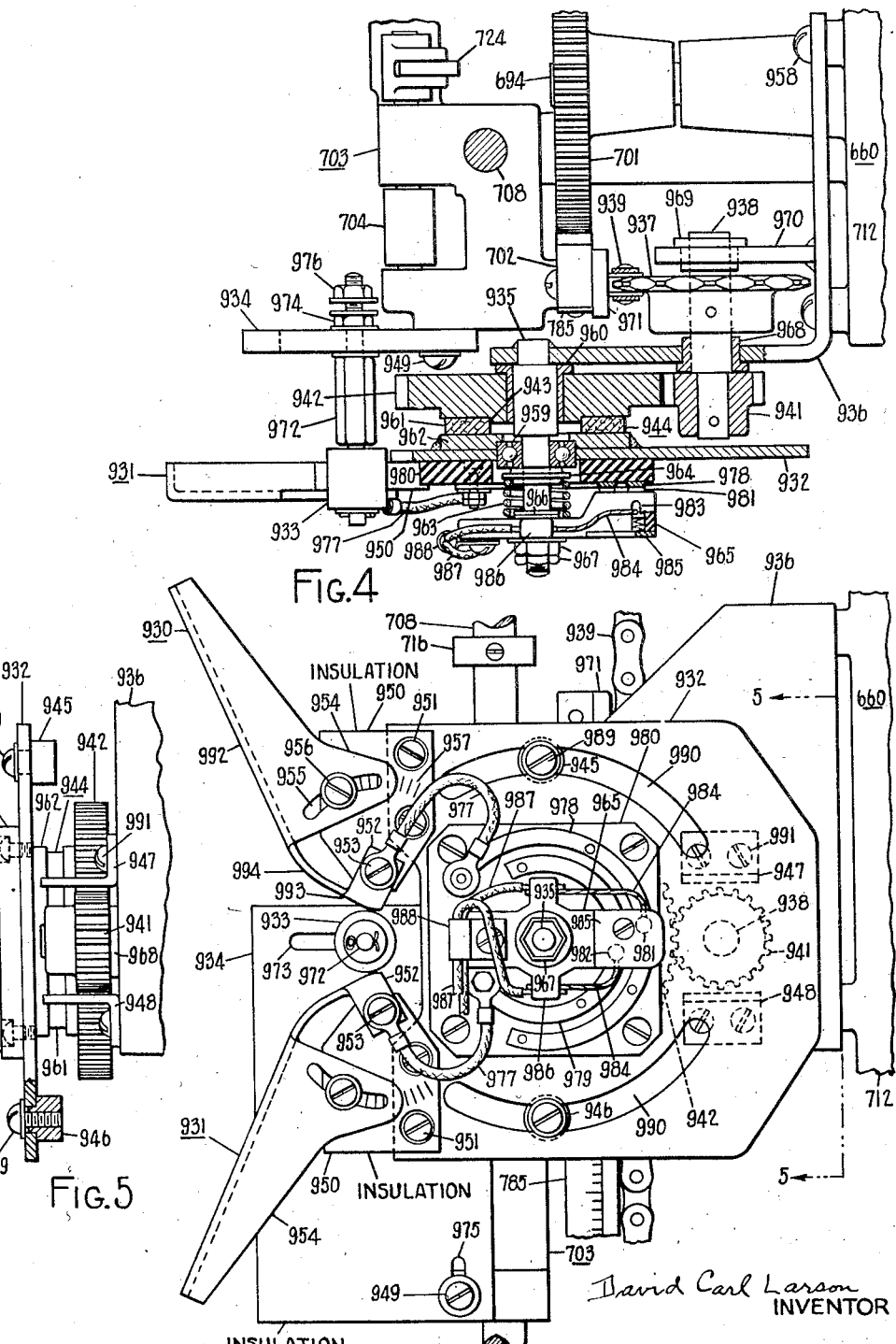

Dec. 29, 1942.     D. C. LARSON     2,306,817
ELEVATOR CONTROL SYSTEM
Filed March 7, 1942     7 Sheets-Sheet 4
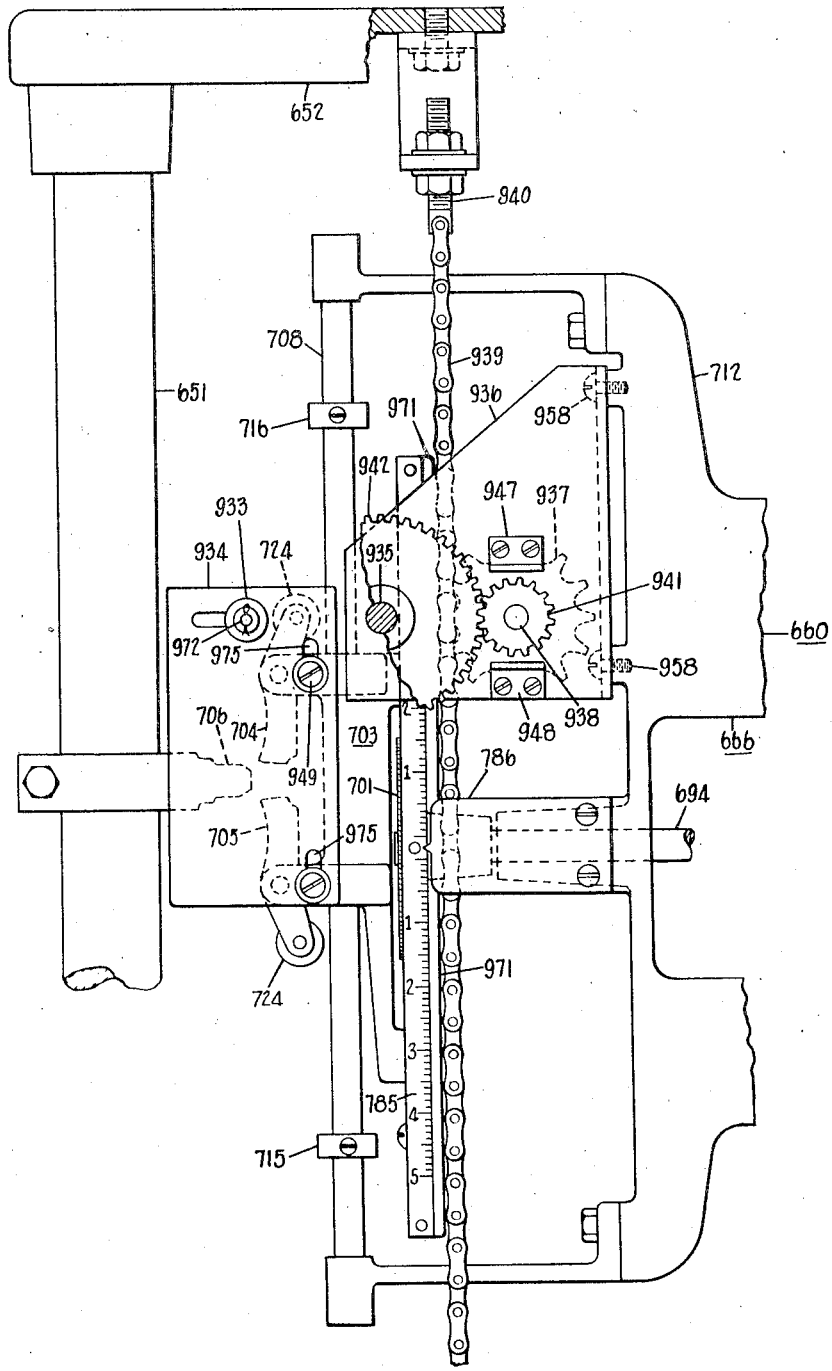
FIG. 6     David Carl Larson     INVENTOR
BY     Arthur E. Bradley     ATTORNEY Dec. 29, 1942.  D. C. LARSON  2,306,817
ELEVATOR CONTROL SYSTEM
Filed March 7, 1942　　7 Sheets-Sheet 5

David Carl Larson  INVENTOR
BY Walter R. Bradley  ATTORNEY

Dec. 29, 1942.　　　D. C. LARSON　　　2,306,817
ELEVATOR CONTROL SYSTEM
Filed March 7, 1942　　　7 Sheets-Sheet 7

David Carl Larson　INVENTOR

BY　Matt... Bradley　ATTORNEY

Patented Dec. 29, 1942

2,306,817

UNITED STATES PATENT OFFICE 2,306,817

ELEVATOR CONTROL SYSTEM

David Carl Larson, Yonkers, N. Y., assignor to Otis Elevator Company, New York, N. Y., a corporation of New Jersey Application March 7, 1942, Serial No. 433,694

19 Claims. (Cl. 187—29)

The invention relates to the control of elevators and to mechanism for effecting such control.

In elevator installations, especially passenger elevators in high rise buildings, it is desirable that the various runs from one floor to another may be made in a minimum of time if maximum service is to be provided. To obtain this operation acceleration and retardation of the elevator car should be effected at as high rate as possible consistent with comfort and safety of the passengers, regardless of the length of the run. Also, the change to a state of retardation on full speed runs and the change from a state of acceleration to a state of retardation on shorter runs should be made at a maximum rate consistent with passenger comfort. Therefore on full speed runs the stop initiating point should be a distance from the floor at which the stop is to be made such that the change to a state of retardation at the desired rate and the retardation at the desired rate will bring the car to a slow speed from which a stop may be made at the floor. Also on short runs acceleration should take place at the same rate as on a full speed run and should be maintained up to a stop initiating point which is a distance from the floor at which the stop is to be made such that the change from a state of acceleration to a state of retardation at the desired rate and the retardation at the desired rate will bring the car to a slow speed from which a stop may be made at the floor.

It is of advantage in such installations to cause after initiation of the stopping operation subsequent control of the retardation of the elevator car to be effected in steps at given fixed distances from the floor at which the stop is being made. In higher speed installations this involves causing one or more of the subsequent retardation steps to occur at distances from the floor greater than the distance of a one floor run. Such control facilitates obtaining the desired retardation.

In many elevator installations in which an attendant is provided in the car, hall lanterns are provided at the floors for indicating that stops are to be made. In the case of a plurality of interconnected elevators, the lighting of the hall lanterns should be controlled so as to avoid false or duplicate indications so that intending passengers at any floor may be correctly advised as to which car is to make the stop. It is of advantage that these lanterns be lighted considerably in advance of the arrival of the car as this affords the intending passenger ample time to position himself in front of the proper elevator. Thus it is desirable to provide a maximum duration of the period during which the hall lanterns are lighted, regardless of the length of the run of the car which is to make the stop.

One object of the invention is to provide a control for an elevator car for initiating stopping of the car at a distance from the floor at which a stop is to be made which enables the acceleration, the change to a state of retardation and the retardation to be effected at maximum rates consistent with passenger comfort regardless of the length of the run and for causing the retardation to be controlled in steps at given fixed distances from the floor, some of which may be greater than the distance of a one floor run.

Another object of the invention is to provide a control for an elevator car for initiating stopping of the car at a distance from the floor at which a stop is to be made which enables the acceleration, the change to a state of retardation and the retardation to be effected at maximum rates consistent with passenger comfort regardless of the length of the run, along with control of the hall lanterns to provide maximum duration of lighting in which lighting of the lantern for a floor at which a stop is to be made is effected before the stop initiating point is reached.

The invention will be described as applied to an elevator system in which the starting of the car is under the control of an attendant in the car whereas stopping of the car is in response to calls registered by push buttons for the floors in the car and by push buttons at the landings. Such a system is described in the Patent No. 2,074,578, granted March 23, 1937, to Edward Lee Dunn and David Carl Larson. In that system, mechanism actuated in accordance with car movement is provided with circuit controlling mechanism which is advanced prior to starting the car. This mechanism causes circuits to be set up later to cause stopping of the car at floors at which calls are registered. As soon as such a circuit is set up for a floor, the proper hall lantern is lighted. Mechanism is also provided to cause retardation of the car in steps which operates at given fixed distances from the floor some of which may be greater than the distance of a one floor run. As applied to such a system, the invention involves the provision of stop initiating mechanism which acts automatically to increase the stop initiating distance in accordance with the length of the run so that on full speed runs the stop is initiated at a minimum distance from the floor at which the stop is to be made in which without discomfort to passengers the car can be brought down to a slow speed from which the car can be brought to a stop and so that on short runs the stop is initiated at a minimum distance from the floor at which a stop is to be made in which without discomfort to passengers the car can be changed from a state of acceleration to a state of retardation and thereafter slowed down to a slow speed from which the car may be brought to a stop.

Features and advantages of the invention will be seen from the following description and appended claims.

In the drawings:

Figure 3 is a view in front elevation of the stop initiating mechanism;

Figure 4 is a top view of the same with parts in section;

Figure 5 is a side view of a portion of the same with parts in section;

Figure 6 is a view of a portion of the selector machine illustrating details of the stop initiating mechanism and their association with other parts of the machine.

Figure 1:
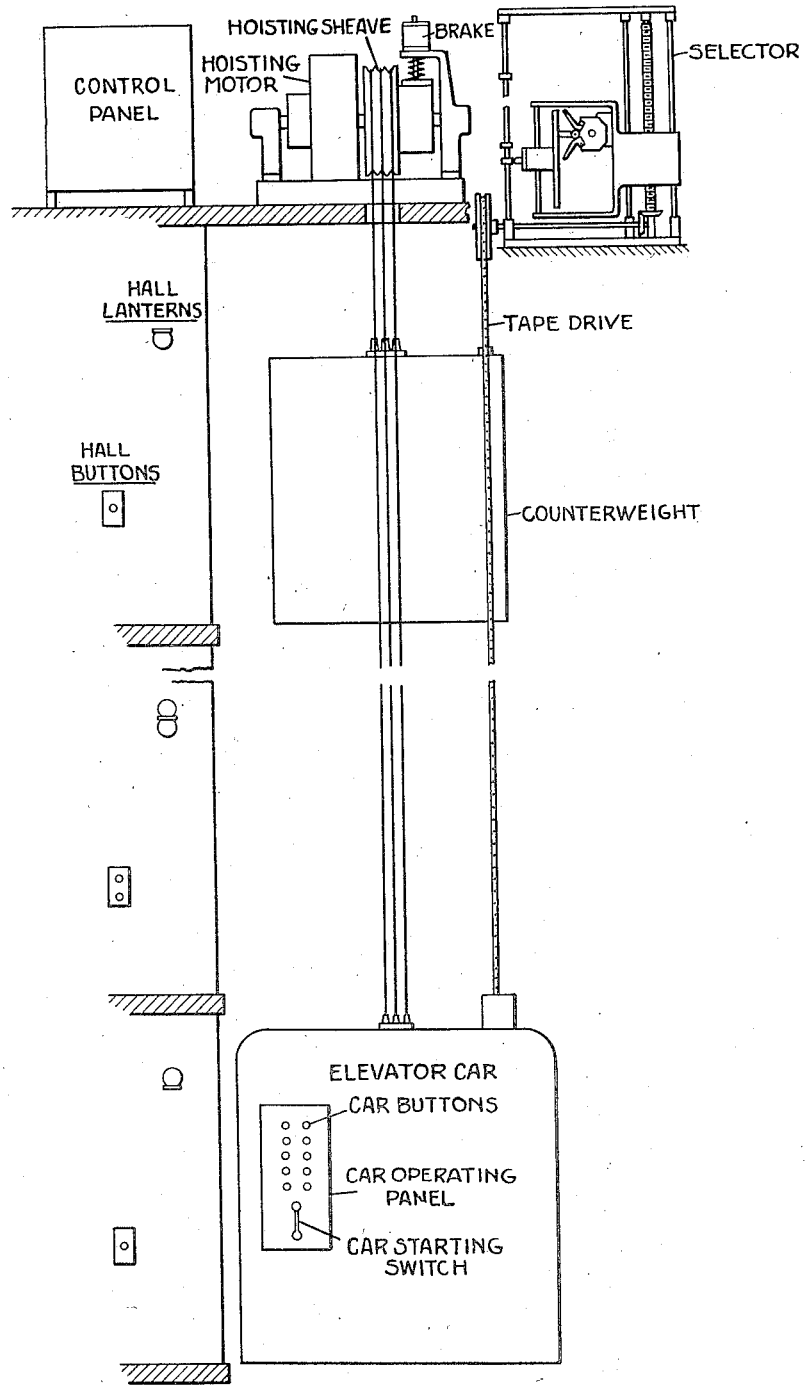
Figure 1 is a schematic representation of an elevator installation in accordance with the invention.

The invention will be described as applied to an elevator control system such as that disclosed in the above mentioned patent to Dunn and Larson to which reference may be had for various details of apparatus which are not herein described. The reference characters employed herein will be the same as those of the patent where the parts are the same. For a general understanding of the invention, reference may be had to Figure 1, wherein various parts of the system, chosen to illustrate the principles of the invention, are indicated by legend. The elevator car is raised and lowered by means of a hoisting motor. This motor drives a traction sheave over which pass the hoisting ropes for the car and counterweight. An electromagnetic brake is provided and is applied to effect the final stopping operation and to hold the car when at rest.

A plurality of control switches are provided in the car, of which the car starting switch and the car push buttons are shown. The starting switch also controls the operation of the doors and car gate. To close the door and gate and start the car, the starting switch is moved counterclockwise to full on position while to open the door and gate the starting switch is moved clockwise.

The car is stopped in response to the push buttons within the car which have been operated and also in response to push buttons at the landings which have been operated.

There is only one car button in the car for each floor, these buttons serving both as up and as down buttons. Thus the car is stopped during its travel in either direction at the floors for which car buttons have been pressed. The car buttons, once pressed, are held in operated condition by means of a magnet 193 (see Figure 7a), thereby registering calls. This magnet is controlled so as to be deenergized when the direction of car travel is reversed. This releases all operated car buttons. The coil is immediately reenergized as a part of the reversing operation, so that subsequently operated car buttons are again held in operated condition.

Both an up hall button and a down hall button are provided at each intermediate floor. Operated up hall buttons cause stopping of the car when travelling in the up direction at the floors at which the buttons are located. Similarly, operated down hall buttons cause stopping of the car when travelling in the down direction at the floors at which the buttons are located. A hall button may be provided also at each of the terminal floors. The hall buttons act through floor relays which, once operated, are maintained so, registering calls and permitting the push buttons which caused their operation to be released.

The floors are served in the natural order of floors for each direction of car travel, regardless of the order in which the push buttons for the floors are operated.

The setting up of circuits to cause the stopping of the car at floors for which push buttons have been pressed is controlled by a selector machine. The setting up of these circuits may be termed picking up the calls. The selector machine is provided with mechanism for initiating the stopping operation at a distance from the floor at which the stop is to be made determined in accordance with the length of the run. It also controls the slowing down of the car and finally causes the car to be brought to a stop at the floor landing.

The selector machine is preferably driven by a tape having teeth formed thereon for actuating a sprocket driving wheel, as disclosed in the application of David Carl Larson, Serial Number 410,380, filed September 11, 1941. The selector machine comprises a crosshead which is driven by a screw, which is in turn driven by the sprocket wheel in accordance with movement of the car. The crosshead carries a carriage upon which is mounted mechanism for picking up the calls. Also the stop initiating mechanism is carried partly on the crosshead and partly on the carriage. The carriage is advanced from a neutral position with respect to the crosshead incident to starting the car but before actual starting takes place. If no call is picked up during the advance, the advance continues until the carriage strikes a limiting stop. Thereafter the carriage moves with the crosshead. The stop initiating mechanism is also advanced so as to be in condition to initiate the stopping operation at the proper distance from any floor at which a stop is to be made. When a call is picked up, the carriage is brought to a stop. This may occur before the carriage is fully advanced on a short run. In any case, the crosshead, which moves with the car, thereafter takes up the advance of the carriage and when the car reaches a certain distance from the floor at which the stop is to be made the stop initiating mechanism operates to initiate the stopping operation. The taking up of the carriage advance by continued movement of the crosshead is also utilized to control slow down of the car after initiation of the stopping operation so that the car may be brought to a stop at the floor.

Hall lanterns are arranged at the floors for advising intending passengers of the approach of the car to the floors at which stops are to be made. Both an up hall lantern and a down hall lantern are provided at each intermediate floor and an up hall lantern is provided at the lower terminal and a down hall lantern at the upper terminal. The up hall lanterns at intermediate floors are lighted during upward car travel and the down hall lanterns at intermediate floors are lighted during downward car travel. When circuits are set up incident to the car in its upward travel answering the highest call to cause the direction of travel of the car to be reversed as the car comes to a stop, the down hall lantern at the floor at which the stop is being made is lighted instead of the up hall lantern at that floor.

A maximum duration of lighting of the hall lanterns is provided. When a call is registered for a floor which is effective to cause stopping of the car at that floor in the direction in which the car is set for travel, the hall lantern for that floor for that direction is lighted as soon as the call is picked up. In case the call is picked up before the carriage becomes fully advanced the hall lantern is lighted before the car starts. Once a hall lantern is lighted it is maintained so until after the car is stopped at the floor and the car starting switch has been moved to start position to start the car. The circuits for the hall lanterns are controlled by the selector machine.

The electromagnetic switches for controlling the operation of the elevator car are mounted on the control panel.

Figure 2:
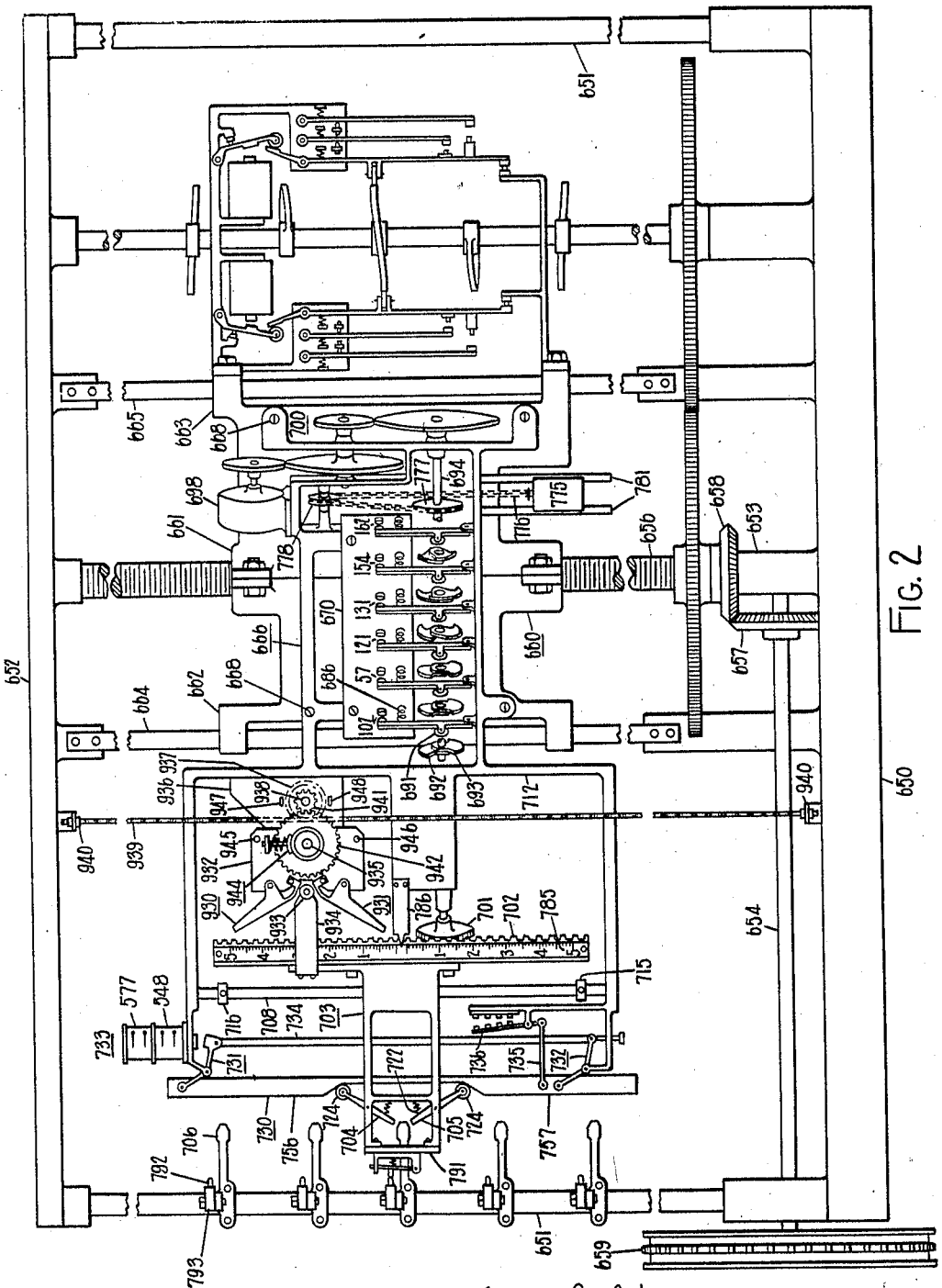
Figure 2 is a schematic representation of a selector machine utilized in the control system for the elevator car illustrating the application of the invention thereto.

Reference may now be had to Figure 2, which illustrates the selector machine schematically. This figure is principally used to give a more comprehensive understanding of the machine and its operation and is not intended to show the details of construction. The reference characters employed in describing the selector machine will be the same as those employed in the aforementioned Patent Number 2,074,578 where the parts are the same. The selector machine comprises a frame formed by a base plate 650, four standards 651, and a top plate 652 supported by these standards. The standards are secured in sockets formed in bosses both on the base plate and the top plate. The base plate 650 is formed with a centrally disposed pedestal 653, which, together with a boss formed on the base plate at one side thereof, provides bearings for the selector machine operating shaft 654. The sprocket driving wheel 659 for the selector machine is secured to the outer end of the shaft. This shaft drives a vertical screw 656 through the intermediary of bevel gears 657 and 658. The vertical screw is supported at its lower end by a ball thrust bearing and at its upper end extends into a bearing in a boss depending from top plate 652.

The vertical screw 656 drives a crosshead 660. This crosshead comprises a split nut 661 and guides 662 and 663 connected to the nut by flanges and cooperating with vertically extending guide bars 664 and 665 respectively to prevent rotative movement of the crosshead and to guide it as it is driven upwardly and downwardly by rotative movement of screw 656. The guide bars 664 and 665 extend from the base plate to the top plate and are secured to bosses formed on these plates.

The crosshead carries a plurality of switches 102, 57, 121, 131, 154 and 162. These switches are principally for controlling the retardation and stopping of the car. They also serve to determine the number of speed switches which operate on short runs. The switches are arranged within a box like frame 666. The frame is formed with lugs provided with apertures through which screws 669 extend to secure the frame to the crosshead. A switch panel 670 is mounted on the frame 666. The stationary contacts of the switches are mounted on this panel while the movable contacts for engaging the stationary contacts are mounted on pivoted levers. Each contact lever is biased into position where the movable contact is disengaged from the stationary contact as by a spring 686 extending from the panel to the contact lever. A stop (not shown) is provided for each contact lever to limit the amount of movement of the lever by its biasing spring 686. Above its pivot point each contact lever is provided with an operating roller 691. This roller is positioned in the path of movement of cams 692 and 693 to move the contact lever about its pivot against the force of spring 686 into contact engaging position.

The operating cams for the switches are secured to an operating shaft 694 rotatively supported on the frame 666. The cams are arranged in pairs side by side on the shaft, one pair for each lever. Each cam is arc-shaped, the camming surface being the arc of a circle with the center coinciding with the center of the operating shaft. The cams are clamped to the shaft and are positioned on the shaft so that the two cams for operating each switch straddle the operating roller 691 for that switch.

With the car stopped at a floor the cams assume a position in which their leading edges are substantially equally spaced from the rollers which they operate, so that substantially the same amount of rotative movement is required in one direction as in the other to close each switch. The cams are set so that their leading edges are increasingly farther from the rollers of the switches which they operate, in the order of switches 102, 57, 121, 131, 154 and 162. In other words, upon rotative movement of the operating shaft in either direction, the switches are closed in the order of switches 102, 57, 121, 131, 154 and 162.

Rotative movement of the cams to close the switches is effected by a torque motor 698 through a train of gears 700. The motor and gears are mounted on the frame 666, the motor being positioned over the cams. This motor is energized to effect rotative movement of the cam in one direction or the other from neutral, depending upon the direction of car movement. Reverse rotative movement of shaft 694 to return the cams to positions permitting the opening of the switches by springs 686 is effected by movement of the elevator car in moving crosshead 660.

In rotating shaft 694 to effect the closing of the switches, the motor also acts through gear 701 and rack 702 meshing therewith and mounted on carriage 703 to vertically move the carriage, either up or down, depending upon the direction of rotation of the shaft. This advances the position of stopping pawls 704 and 705 with respect to the crosshead 660, these pawls being pivotally mounted on the carriage. The pawls cooperate with stopping lugs 706, one for each floor, secured to one of the standards 651, to bring carriage 703 to a stop. Thus, the rack 702 is stopped so that as the crosshead is driven by the car, gear 701 is rotated by the rack in a direction to move operating cams for the selector switches back to the positions illustrated. The carriage 703 is guided in its upward and downward movement by means of guide bars, one of which designated 708 being shown.

Upon counterclockwise rotative movement of gear 701, the rack 702 and carriage 703 are moved downwardly on the guide bars. This movement continues so long as operating shaft 694 is rotated by motor 698 and until the carriage engages stop collar 715 provided on guide bar 708. A similar stop collar 716 is provided on guide bar 708 above the carriage to limit the amount of upward movement on the bars upon clockwise rotative movement of gear 701 by the motor. This movement of the carriage on its guide bars is relative to frame 666 and therefore to the crosshead 660. The motor is controlled to effect this movement of the carriage in the same direction as the crosshead is to be moved. Thus the carriage is advanced by the motor with respect to the crosshead.

Compression springs 722 are arranged between pawls 704 and 705 and the carriage to bias the pawls outwardly from the carriage. The pawls are reversed so that pawl 704 is biased by its spring for clockwise rotative movement while pawl 705 is biased by its spring for counter-clockwise rotative movement. Each pawl is provided with an operating roller 724. The pawls are retracted against the force of springs 722 to clear the stopping lugs by pushing the rollers 724 outwardly from the carriage 703. The rollers are pushed outwardly by cam 730. This cam is carried by bell crank levers 731 and 732 mounted on the crosshead and is biased to retracted position. An electromagnet 733 carried by the crosshead is provided for controlling the action of the cam. This magnet which is termed the stop magnet comprises two coils 577 and 548. The control system is arranged so that the coil 577 is energized to effect the retraction of the pawls whereas, to permit the pawls to be reextended for cooperating with the stopping lugs, coil 548 is also energized to magnetically neutralize coil 577. Upon the energization of coil 577, the bell crank lever 731 is pulled upwardly and, through a link 734, bell crank lever 732 is also pulled upwardly, causing the cam to be extended outwardly to push rollers 724 away from the carriage. This forces the pawls into retracted positions against their springs 722.

In moving outwardly, cam 730 acts through link 735 to pull contact lever 736 clockwise about its pivot to close the contacts of a switch. One pair of these contacts controls the energization of motor 698. Thus the motor for advancing the carriage is not energized until the pawls are moved to retracted position. The cam is formed with outwardly extending or stepped portions 756 and 757 at its upper and lower ends respectively to prevent damage in case of movement of the crosshead without energization of coil 577 to retract the pawls.

The weight of the carriage 703 and mechanism carried thereby is counterbalanced by counterweight 775 connected by a sprocket chain 776 to a sprocket 777 mounted on operating shaft 694. The chain is secured to the sprocket by a pin passing through the end link of the chain. After extending substantially half way around the sprocket, the chain passes upwardly over a pulley 778 pivotally mounted on a pin supported by guide bars 781 for the counterweight. These guide bars are secured to frame 666. With this arrangement, upon rotative movement of the torque motor 698 in a direction to advance the carriage in the upward direction, the chain is unwound from the sprocket, lowering the counterweight. When the torque motor is rotated in the opposite direction to advance the carriage downwardly, the chain is wound onto the sprocket, lifting the counterweight. Thus the counterweight effectively counterbalances the weight of the carriage and parts carried thereby.

The operation of the mechanism so far described is as follows: Upon energization of coil 577, bell cranks 731 and 732 are pulled counterclockwise about their pivots. This extends cam 730, which pushes rollers 724 outwardly, swinging pawls 704 and 705 about their pivots against the force of their biasing springs to retracted positions. Cam 730, in moving outwardly, acts through link 735 to swing contact lever 736 to contact engaging position. This causes the circuit for motor 698 to be completed. The motor acts through gearing 700 to rotate operating shaft 694. The direction of rotation is determined by the control system.

Assume that the controlling mechanism is set for up travel of the elevator car. Under such conditions, the torque motor rotates shaft 694 in a clockwise direction. As this rotative movement takes place, the leading edges of the cams 692 engage the operating rollers of selector switches 102, 57, 121, 131, 154 and 162 in the order named, to move these switches to closed positions. At the same time, gear 701 moves rack 702 in the up direction, causing upward movement of the carriage 703. When the carriage engages stop collar 716 on guide bar 708, it is brought to a stop. This prevents further rotative movement of gear 701, which brings operating motor 698 to a stop.

When a call is picked up, coil 548 of magnet 733 is energized, neutralizing the magnetic action of coil 577. This releases bell cranks 731 and 732 and cam 730 is returned to retracted position. This return movement is effected quickly due to the kick off action of pawl springs 722. Pawl 705 is thus extended for cooperation with the stopping lug 706 for the floor for which the circuits have been set up. The neutralization of coil 577 and the retraction of cam 730 are effected at a point where pawl 705, upon being extended by its biasing spring, is immediately beneath the stopping lug. Only pawl 705 is effective for cooperation with the stopping lugs during up car travel. Pawl 704 is effective only during down car travel. Thus, pawl 705 may be termed the up stopping pawl while pawl 704 may be termed the down stopping pawl. The return of cam 730 to retracted position also causes movement of contact lever 736 about its pivot to open the contacts. This causes the motor 698 to be deenergized.

The small clearance between up pawl 705 and the stopping lug is taken up by the upward movement of crosshead 660 as a result of upward movement of the elevator car. The engagement of pawl 705 with the stopping lug brings the carriage 703 to a stop. The crosshead, however, continues to be driven upwardly by the elevator car, taking up the advance of the carriage. As continued upward movement of the crosshead takes place, gear 701 is rotated counterclockwise by rack 702. This rotates shaft 694 counterclockwise, returning cams 692 to the positions shown, resulting in the opening of selector switches 162, 154, 131, 121, 57 and 102 in sequence in the order named as the car reaches certain points in its approach to the landing.

Had the controlling mechanism for the elevator car been set for down travel instead of up travel, the torque motor would have been energized by the closing of switch contacts controlled by magnet 733 so as to rotate shaft 694 in a counterclockwise direction. Under such conditions, the selector switches are closed by cams 693 instead of cams 692. Gear 701 moves rack 702 in the down direction, causing downward movement of carriage 703 until it is brought to a stop by engaging stop collar 715 on bar 708. When a call is picked up during downward travel, coil 548 is again energized to neutralize the magnetic action of coil 577. Cam 730 is thereupon retracted and down stopping pawl 704 is extended for cooperation with the stopping lug 706 for the floor for which the call has been picked up. When the engagement of pawl 704 and the stopping lug occurs, the carriage is brought to a stop but the crosshead continues to be driven downwardly by the elevator car, taking up the advance of the carriage. Thus, gear 701 is rotated by rack 702 as continued downward movement of the crosshead takes place. This results in the return of cams 693 to the position shown and the opening of selector switches 162, 154, 131, 121, 57 and 102 in sequence in the order named.

The energization of coil 577 is effected to cause the energization of torque motor 698 and this torque motor operates to complete the advancement of carriage 703 before the starting of the car takes place. The carriage may be moved to full advanced position or it may be brought to a stop before reaching this point. If no call is picked up before the carriage reaches full advanced position, the carriage is brought to a stop upon engagement with one of the stop collars 715 or 716 and motor 698 remains energized until a call is picked up. However, should a call be picked up before the carriage becomes fully advanced, the torque motor is deenergized and the carriage comes to a stop.

When a call is picked up with only a partial advance of the carriage, the clearance between the pawl and stopping lug is taken up by the starting of the car to move the crosshead an amount sufficient to effect this engagement. When full advance of the carriage has been attained, however, the car will be in motion at the time a call is picked up and the car continues to drive the crosshead after the pawls are released, taking up the clearance. In either case, movement of the crosshead takes up the advance of the carriage and in so doing causes the return of the cams of shaft 694 to switch opening positions from the positions to which they have moved, opening all of the selector switches which were closed.

Selector machines of a construction shown on these drawings are usually geared at a ratio of 120 to 1, i. e., the crosshead moves 1 foot for each 120 feet of car travel. A scale 785 is secured to rack 702 and is marked off in feet at this ratio. The scale is graduated the same on each side of the neutral point, the ungraduated space in the middle being for the working clearance of the pawls. In other words, when the car is stopped at a floor during up car travel, the pointer 786, which is secured to frame 659, and represents the position of the car, is at the line just below the central space. When the stop is made during down car travel, the pointer is at the line just above the space. Each mark on the scale represents one foot, those marks opposite the numerals 1, 2, 3, 4 and 5 representing 10, 20, 30, 40 and 50 feet respectively. The scale and pointer are for making various settings, including the setting of the cams 692 and 693.

The calls are picked up by brushes carried on a panel 791 mounted on carriage 703. These brushes pick up the calls by engaging alive stationary contacts. These stationary contacts are rendered alive by the pressing of the car and hall buttons. The brushes for engaging the stationary contacts controlled by the hall buttons are themselves controlled to be rendered alive in accordance with direction of car travel. The stationary contacts 792 with which these and other brushes carried on the panel cooperate are mounted on floor bars 793 supported by standards 651. Among these are the stationary contacts and brushes in the circuits for the hall lanterns.

As soon as an alive contact is engaged by an alive call pick up brush, circuits are set up to cause the energization of coil 548 of magnet 733 which results in the deenergization of torque motor 698, stopping relative movement between carriage 703 and crosshead 660 in the event that such relative movement has not already been stopped by engagement of the carriage with one of the stopping collars 715 or 716 and which extends the stopping pawl for the direction of car travel for engagement with the stopping lug 706 for the floor for which such circuits have been set up. As soon as the clearance between the pawl and the stopping lug is taken up by movement of the crosshead, the carriage is brought to a stop in this position. As a result continued movement of the crosshead causes the opening of those selector switches which have been closed as the car continues its movement to the floor at which the stop is to be made.

The levelling mechanism for causing the car to be brought to an exact landing level will not be described. It is shown to the right of guide bar 665 in Figure 2.

The completion of the circuit for coil 548 by the engagement of a call pick up brush with an alive stationary contact does not initiate the actual stopping operation. As pointed out above, such circuits may be set up before the car has started. The setting up of this circuit, however, does pick up the call which was registered by the push button and causes reset of the operated floor relay where the call was registered by a hall button. It also causes immediate lighting of the proper hall lantern, giving a maximum advance notification that the car is to stop at the floor. The actual initiation of the stopping operation is effected by a stop initiating mechanism carried part on the carriage and part on the crosshead. This mechanism acts on full speed runs to initiate the stopping operation with the car at a fixed distance from the floor at which the stop is to be made, whereas on short floor runs it acts to initiate the stopping operation at a less distance from the floor, this distance becoming less the shorter the length of the run.

The stop initiating mechanism comprises a pair of stop initiating cams 930 and 931 mounted on a plate 932 carried by the crosshead 660 for cooperating with a roller 933 mounted on a plate 934 carried by the carriage 703. Plate 932 is pivotally mounted on a stub shaft 935 secured to a bracket 936 mounted on the crosshead. A sprocket wheel 937 is secured to a shaft 938 pivotally mounted on the bracket. This sprocket wheel meshes with a stationary chain 939 secured at its ends by tensioning bolts 940 to the base plate and top plate of the selector. Also secured to shaft 938 to be driven by the sprocket is a pinion 941. This pinion meshes with a gear 942 pivotally mounted on stub shaft 935. This gear acts through a clutch 944 to rotate plate 932 upon movement of the car. The plate is provided with a pair of stops 945 and 946 for engaging abutments 947 and 948 respectively on bracket 935 to limit the amount of rotative movement. Roller 933 is "alive" when the car is in service while cams 930 and 931 are controlled by direction contacts so that only cam 931 can be "alive" during up car travel and only cam 930 can be "alive" during down car travel.

With this arrangement, upon the advancement of carriage 703 with respect to the crosshead, the roller 933, in the event the carriage moves upwardly, engages cam 930 to move the plate 932 clockwise about its pivot. The clutch 944 slips to permit this movement. This movement continues until the roller is brought to a stop, either by the carriage being brought to a stop by stop collar 716 or by deenergization of the torque motor as a result of the picking up of a call. Upon movement of the crosshead, the sprocket wheel 937 is rotated by chain 939 counterclockwise, thereby causing clockwise rotative movement of gear 942. The gear acts through clutch 944 to effect clockwise rotative movement of plate 932. At the same time the plate is moved upwardly with the crosshead. If no call has been picked up and the carriage is up against the collar, the roller moves upwardly along with the plate so that the only relative movement of the cams with respect to the roller is due to the rotative movement of plate 932. This rotative movement continues until the plate is brought to a stop by the engagement of stop 945 with the abutment 947. Thereafter the roller and cams continue to move upwardly in a fixed relationship, the clutch 944 yielding to permit rotative movement of gear 945 without affecting plate 932.

When a call is picked up and the carriage stopped by engagement of the up pawl with the stopping lug for the floor for which a call is registered, upward movement of roller 933 is discontinued. The upward movement of the cams, however, continues. Assuming that the plate has already been stopped by the engagement of stop 945 with its abutment, when the car arrives at a certain distance from the landing the lower cam 931 engages the roller and, as cam 931 is "alive" at this time, completes a circuit to initiate the stopping operation. The conditions described are for a full speed run and provides maximum stopping distance. When the lower cam 931 engages the stopping roller 933, the roller now being stationary acts as the cam continues its upward movement to move plate 932 counterclockwise about its pivot to return the cams to a neutral position as the crosshead takes up the advance of the carriage. The clutch 944 yields to permit this movement.

Should a call be picked up under conditions where the car has started but stop 945 has not yet engaged its abutment, the advance of the roller 933 with respect to cam 931 is taken up by combined linear and rotative movement of plate 932 until the rotative movement of the plate is stopped by the engagement of the stop with its abutment. From this point on the advance is taken up by linear movement of plate 932 as above explained, until cam 931 engages the roller. The conditions here assumed are also for a full speed run although the total length of the run is less. Inasmuch as the stop 945 is against its abutment at the time the cam engages the roller, the same relationship obtains as under the first assumption and maximum stopping distance is provided. Continued movement of the crosshead returns the cams to neutral position as above described.

As the total length of run decreases, a point is reached where cam 931 engages roller 933 before stop 945 engages its abutment. The less the angle through which the cams have turned before the following cam hits the roller, the less the advance of the roller with respect to the pivot point of plate 932 at the instant the contact takes place and therefore the less the distance of the car at this instant from the floor at which the stop is to be made. Since this angle becomes less the shorter the length of the run, the stopping distance is less the shorter the length of the run. Also, on short runs, the acceleration portion of the run, i. e., from starting to the portion of stop initiation is less than half the length of the run and automatically becomes a less portion of the run the shorter the length of the run due to the shape and angular relationship of the cams. This enables maximum acceleration consistent with passenger comfort to be effected on short runs right up to the point of stop initiation without sacrifice of control of the stopping operation.

The car does not start to slow down on short runs at the instant the stop initiating point is reached, the initiation of the stop causing an immediate decrease in the rate of acceleration and thereafter starts retardation, enabling this change from acceleration to retardation to be made without any discomfort to the passengers and so that the remainder of the retardation may be effected smoothly and at the desired rate by the opening of the selector switches. The portions of the run utilized for acceleration and for stopping on various length short runs depends upon the characteristics of the particular installation. The stop initiating mechanism as will be seen from later description is readily adjustable to meet various operation requirements.

When the carriage 703 moves downwardly in advancing with respect to the crosshead the roller engages cam 931 to move plate 932 counterclockwise about its pivot. Upon movement of the crosshead the sprocket wheel 937 is rotated by chain 939 clockwise to cause counterclockwise rotative movement of plate 932. At the same time the plate is moved downwardly with the crosshead. If no call has been picked up the roller moves downwardly along with the plate so that the only relative movement of the cam with respect to the roller is due to the rotative movement of the plate. After this rotative movement is stopped by the engagement of stop 946 with abutment 948, the roller and cams continue to move downwardly in fixed relationship.

When a call is picked up and the carriage stopped by the engagement of the down pawl with the stopping lug for the floor for which a call is registered, downward movement of the roller is discontinued but downward movement of the cams continues. When the car arrives at a certain distance from the landing the upper cam 930 engages the roller to complete a circuit to initiate the stopping operation. Continued movement of the crosshead returns the cams to a neutral position as the crosshead takes up the advance of the carriage.

As in the case of short runs on upward movement, should a call be picked up under conditions where the roller is engaged by the cam 930 before stop 946 engages its abutment, the distance of the stop initiating point from the floor at which a stop is to be made becomes less, the shorter the length of the run and acceleration becomes a less portion of the total run, the shorter the length of the run.

The details of construction of the stop initiating mechanism are shown in Figures 3, 4, 5 and 6 inclusive to which reference may now be had. The cams 930 and 931 are mounted on insulating blocks 950 secured as by screws 951 to plate 932 in opposing relation on each side of the horizontal center line of the plate as viewed in Figure 3. Each cam is formed with a lug 952 through which a screw 953 extends to secure the cam to the mounting block. Also each cam is formed with a flange 954 having an arcuate slot 955 through which another screw 956 extends to adjust the angle of the cam and secure it in adjusted position to the mounting block. Screw 953 serves as a pivot screw in adjusting the cam and an arcuate scale 957 is provided on the mounting block in association with the slot to facilitate the adjustment.

The bracket 936 in which the pivot shaft 935 for plate 932 is mounted is an angle bracket and is secured to the extension 712 of the crosshead frame 666 by screws 958 extending through one arm of the bracket. The shaft 935 is secured as by welding to the other arm of the bracket. The plate 932 is mounted on a thrust bearing 959 arranged on a reduced portion of the stub shaft. Gear 942 is provided with a bearing 960 for rotatably mounting the gear on shaft 935. The clutch 944 comprises a ring 961 of a fibrous material such as brake lining material. This ring is arranged between a plate 962 welded to plate 932 and a face formed on gear 942. A shoulder 943 is provided on the face of the gear for locating the ring. The plate 962 is formed with a pocket to receive bearing 959. The plates, gear and ring are pressed together by a spring 963 acting through the thrust bearing. This spring is arranged on the shaft between a spring seat washer 964 and a contact arm 965. Abutting a shoulder on the shaft are centering washers 966 for the spring, the contact arm being held against the washers by nuts 967 on the threaded end of the shaft.

The shaft 938 on which the pinion 941 and sprocket wheel 937 are mounted is rotatably mounted in bearings 968 and 969 in bracket 936 and an extension 970 secured to the bracket. Both the pinion and sprocket wheel are pinned to the shaft. The sprocket chain 939 is maintained in mesh with the sprocket wheel by an elongated shoe 971 secured to rack 792 of carriage 793.

The contact roller 933 for the cams 930 and 931 is mounted on a shoulder pin 972 and threaded end of this pin extends through a horizontal slot 973 in plate 934 and the pin is secured to the plate by a nut 974. This plate is of insulating material. The roller is held on the pin by a washer and cotter pin. The plate 934 is secured to carriage 793 by screws 949 extending through vertical slots 975 in plate 934. The slots 975 are for adjusting the plate to place the roller on the horizontal center line through the pivot point of plate 932 while slot 973 is for adjusting the position of the roller inwardly or outwardly with respect to the cams.

The wire (not shown) for connecting the roller in the system is connected to the threaded end of pin 972, a binding nut 976 being provided for effecting this connection. Flexible conductors 977 are provided for effecting the electrical connection to the cams. The screws 953 also serve to secure the terminal clips for the conductors to the cams. The other ends of the conductors are connected to contacting rings 978 and 979. These rings are mounted on an insulating block 980 secured as by screws to plate 932. The contact arm 965 which is of insulating material carries a pair of spring pressed brushes 981 and 982 engaging contact rings 978 and 979 respectively. Slots 983 lead into the sides of the sockets for the brushes, to provide passages for the connecting wires 984 of the brushes. The outer ends of the sockets are closed by plate 985 of insulating material secured to the contact arm as by a screw. The connectors for the brushes lead into arms 986 formed on the contact arm where they are soldered to connecting wires 987 for connecting the brushes in the control system. These wires are led through a clip 988 secured to the other end of the contact arm by a screw.

The stops 945 and 946 for plate 932 are secured to the plate by screws 989 passing through arcuate slots 990. The abutments 947 and 948 for the stops are secured to the bracket 936 as by screws 991, these abutments being in the form of angles with arms extending outwardly into the path of movement of the stops on each side of pinion 941.

Assume that it is desired to set the selector for a 1000 feet per minute installation. Assuming further that a 50 foot maximum light advance for lighting the hall lanterns at floors at which stops are to be made is desired, the stop collars 715 and 716 are set to permit full advance movement of carriage 703. In certain installations it may be desirable to have less than a 50 foot light advance and in such cases the stop collars would be set to restrict the advance of the carriage to an amount which is enough greater than stopping distance to enable the carriage to be stopped by the pawl before the stop initiating point is reached. The preliminary setting of cams 930 and 931 is such that they are fairly close together, i. e., with screws 956 well to the right in arcuate slots 955. The angles of these cams with respect to the horizontal center line of plate 932 are usually made equal as indicated on the scales on insulating blocks 950. Also the roller 933 is set about three-quarters of the way over to the left in slot 973 as viewed in Figure 3.

The approximate stopping distance in feet on a full speed run for a 1000 feet per minute installation of the type disclosed in the aforesaid patent to Dunn and Larson is 33 feet, although this distance may vary in different installations. To set the stop initiating mechanism to provide a 33 foot stopping distance on a full speed run, the carriage is moved in one direction to a point where the 33 foot mark on scale 785 is opposite the pointer 786. Assuming that the carriage is moved upwardly to this point, the plate 932 is then swung clockwise as viewed in Figure 3 until the lower cam 931 just touches roller 933. The upper stop 945 is then adjusted by moving it in the arcuate slot 990 until it just touches its abutment 947. A similar adjustment is made by moving the carriage downwardly and swinging plate 932 counterclockwise until upper cam 930 just touches the roller and the stop 946 is set against its abutment 948.

The selector switches are now set to open at points to enable the desired retardation of the car to be obtained. In installations such as that of the aforesaid patent to Dunn and Larson in which a 33 foot stopping distance is provided, switches 162, 154, 131, 121 and 102 may be set to open at 21½ feet, 12½ feet, 6 feet, 2¼ feet and 1 foot respectively from the floor. These settings are approximate and may be altered in making the final adjustments. The setting of switch 57 would depend upon the type of door operator and would range from 1 foot to 2 feet from the floor. To obtain these settings the carriage is positioned so that the pointer is opposite these particular distances on the scale and the leading edges of the cams 692 and 693 for operating the respective switches are set to just crack open these switches at these points.

The system is then operated on short runs and the positions of the cams 930 and 931 and roller 933 are adjusted to give the desired operation. Movement of roller 933 toward the cams increases the stopping distance on short runs, but has little effect on longer runs. Moving the cams together increases the stopping distance on longer runs without greatly affecting the short runs. After the desired operation has been obtained for these runs the stops 945 and 946 are readjusted to rest against their abutments with the cams in engagement with roller 933 with the pointer on the 33 foot mark of the scale. Similar operation would be had for setting the stopping mechanism for speeds different from 1000 feet per minute.

It will be noted that with the roller 933 to the left in its slot from the position illustrated in Figure 3 the plate 932 would not be returned exactly to central position as the car comes into a floor at which a stop is being made. However, the plate will be brought back to a neutral position such that the operation is not altered as the cams are near enough to center position that the positions to which they are moved by advance of the roller in either direction are not changed. It will also be noted that each of the cams is formed with two flat portions 992 and 993 joined by a curve portion 994. While the curve of the cams as theoretically laid out is a continuous one, it has been found that cams such as shown in the drawings are satisfactory and have a manufacturing advantage in forming the flanges 954 and lugs 952.

As a resume of the operation of the selector machine as a whole, assume that the car is standing at a floor and set for travel in the up direction. Upon energization of coil 577 of magnet 733, cam 730 is extended outwardly to force the pawls into retracted positions. At the same time lever 736 is operated to close contacts to energize motor 698. The motor acts to close the selector switches and advance carriage 703 in the up direction. Assuming that no call is picked up during the advance, the carriage is brought to a stop upon its engaging stop collar 716 so that the motor is brought to a stop with all the selector switches closed. During this advance roller 933 engages upper cam 930 to swing plate 932 clockwise about its pivot shaft 935. When the car is started the carriage and crosshead move upwardly as a unit whereas the cams 930 and 931 are further rotated clockwise about pivot shaft 935 by sprocket wheel 937 and chain 939 until plate 932 is brought to a stop by the engagement of stop 945 with abutment 947. Thereafter, as the crosshead and carriage continue their upward movement as a unit the cams 930, 931 and roller 933 remain in this fixed relative position.

Upon the engagement of an alive stationary contact by an alive brush to pick up a call, coil 548 of magnet 733 is energized causing cam 730 to be returned to retracted position. Thus pawl 705 is extended for cooperation with stopping lug 706 for the floor for which the call has been picked up. The engagement of the pawl with the lug brings carriage 703 to a stop. The crosshead, however, continues its upward movement and upon engagement of lower cam 931 with roller 933 a circuit is completed to initiate the stopping operation. As the crosshead continues its movement, the selector switches open in sequence to bring the car to a slow speed from which it may be brought to a stop. At the same time the roller 933 being stationary returns cams 930 and 931 to neutral position.

Assume that the call is picked up after the car has been started but before plate 932 is rotated by the sprocket and chain to its limiting position. The carriage is brought to a stop by engagement of the pawl with the stopping lug. Should the run be long enough to enable the car to reach full speed, the rotative movement of plate 932 continues until it is brought to a stop by the engagement of stop 945 with abutment 947. Thus maximum stopping distance is provided upon engagement of the lower cam 931 with roller 933. However, on short runs as previously explained, the plate 932 will not be rotated to its limiting position by the time the lower cam 931 engages roller 933 to initiate the stopping operation. Under such conditions the system is changed from a state of acceleration to one of retardation so that the proper retardation may be obtained in response to the opening of the selector switches as the car arrives at the distances from the floors at which these switches are set to open. On short runs such as runs of one, two and even three floors for a 1000 feet per minute installation, all of the speed switches controlled by the selector switches may not be operated or if operated may not be in long enough to be materially effective. This enables the change from a state of acceleration to a state of retardation under such conditions to bring the system into a condition in which the desired retardation is obtained upon the opening of the selector switches which have operated.

Should the car have been set for downward travel, motor 698 acts to advance the carriage 703 downwardly causing operation of the selector switches. Also roller 933 engages cam 931 to swing the plate 932 counterclockwise about its pivot shaft. When a call is picked up, further downward movement of the carriage is prevented by the engagement of down pawl 704 with the stopping lug for the floor at which the stop is to be made and, upon the engagement of cam 930 with roller 933 by downward movement of the crosshead after the carriage has been brought to a stop, the stopping operation is initiated. Continued downward movement of the crosshead returns the cams to a neutral position and opens the operated selector switches in sequence as the car approaches and finally arrives at the floor at which a stop is being made.

Figure 7A:
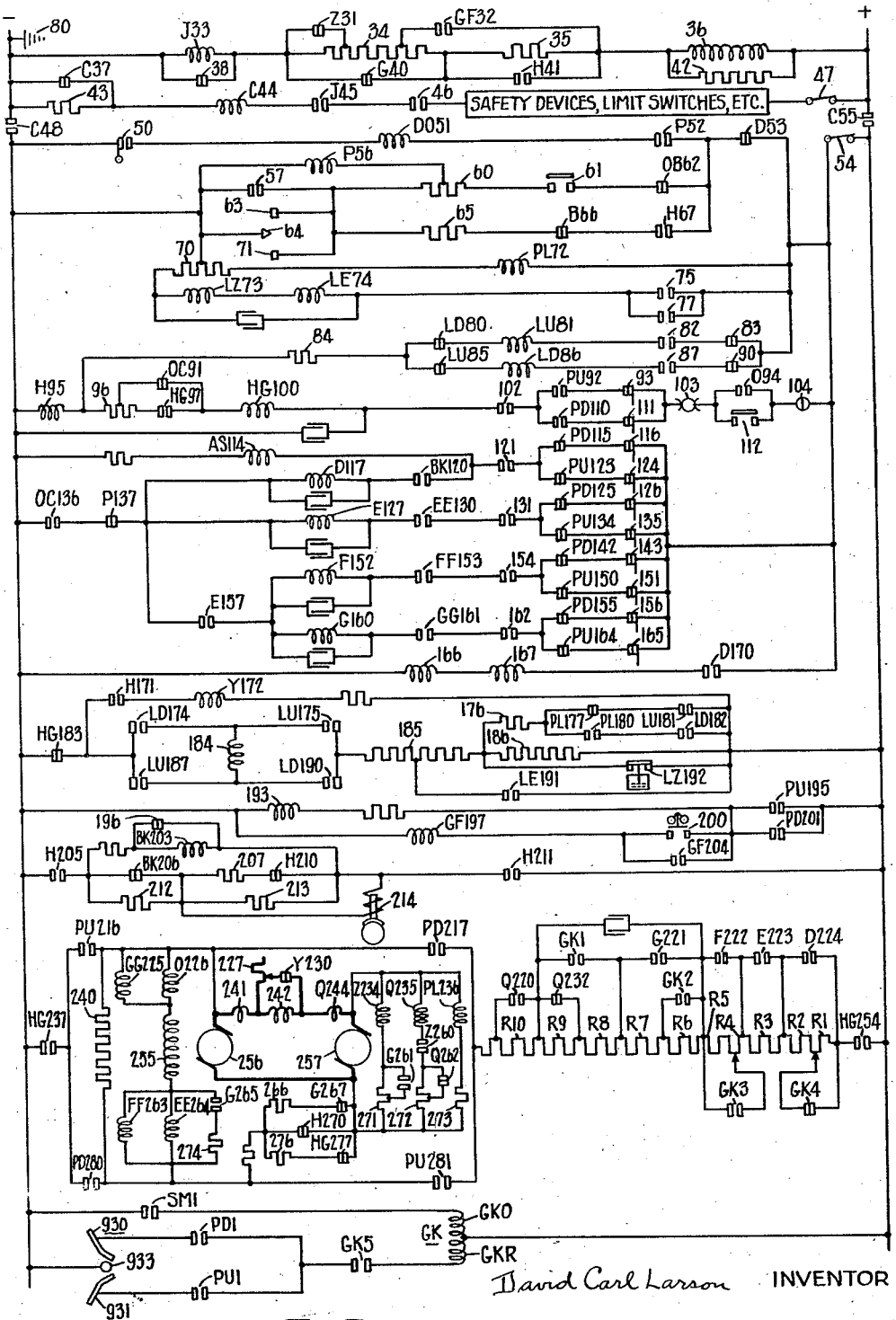
Figures 7a, 7b and 7c, taken together, constitute a simplified wiring diagram of the power and control circuits for the elevator car.
Figure 7B:
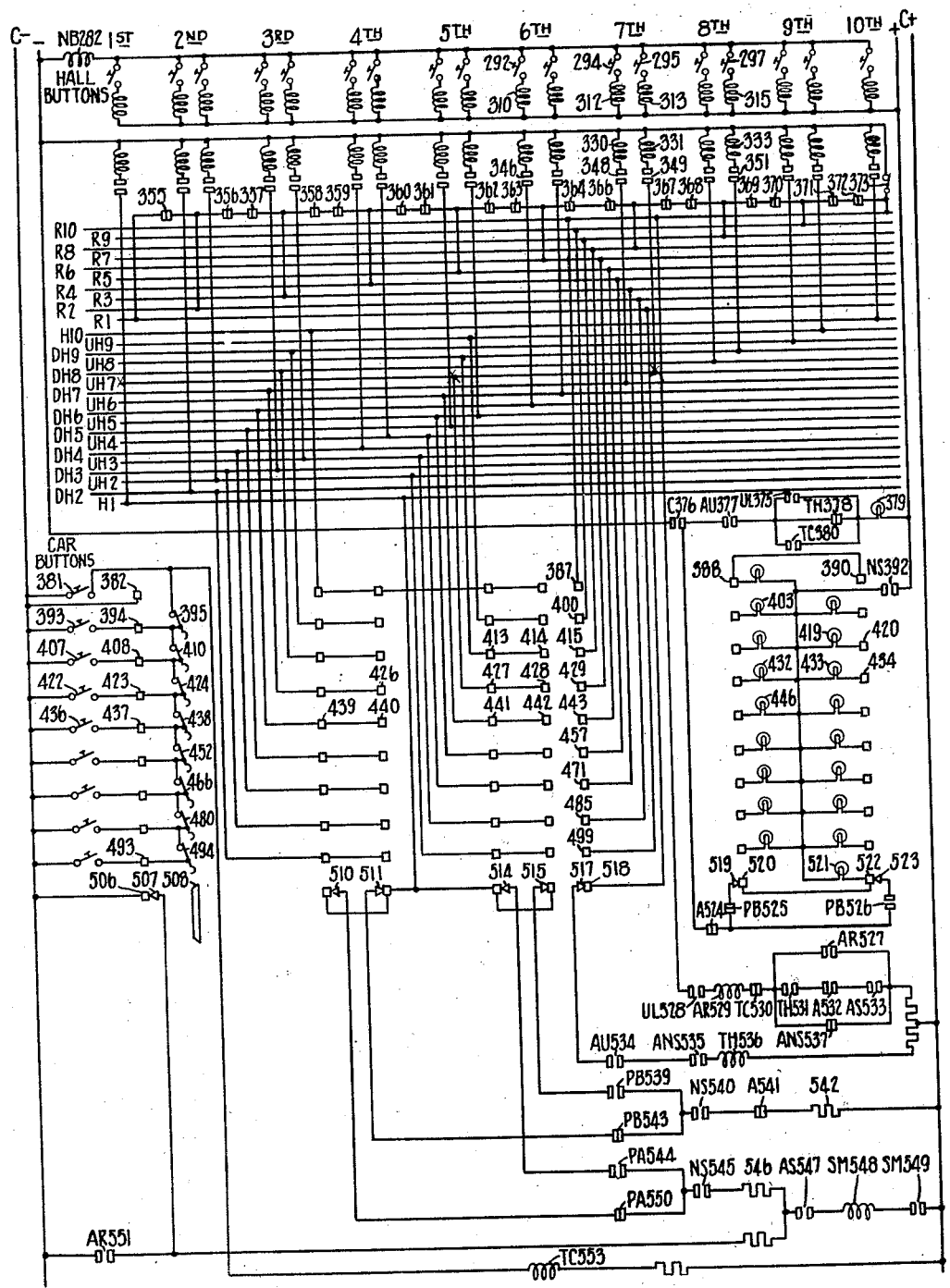
Figure 7C:
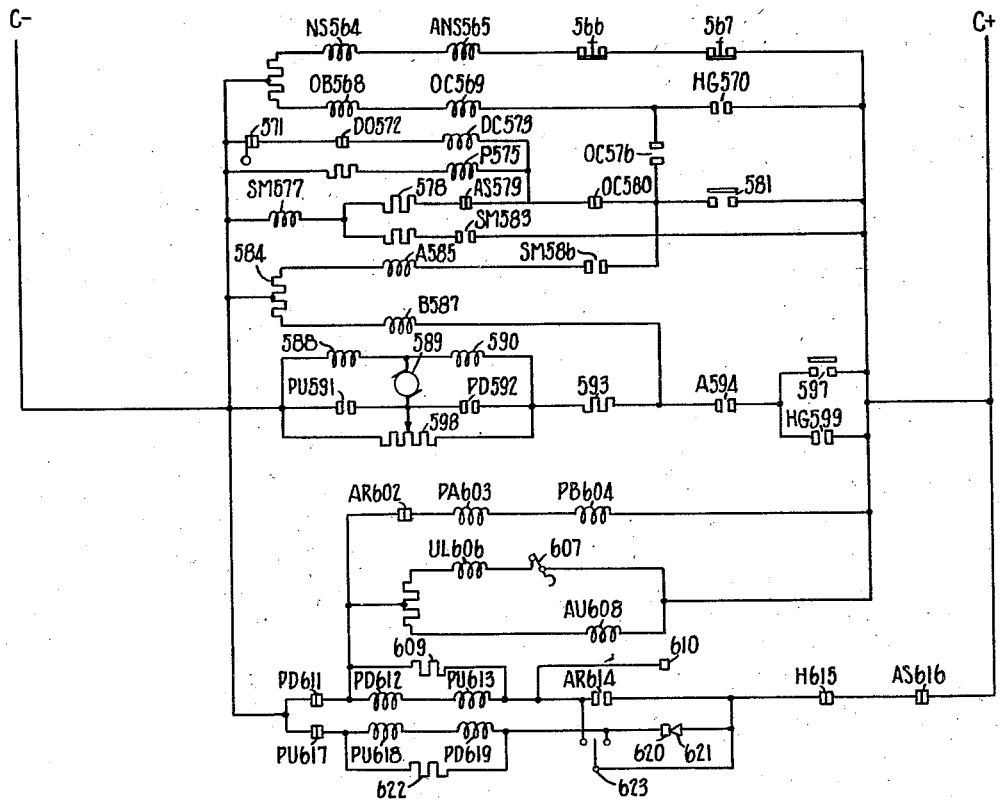

Reference may now be had to Figures 7a, 7b and 7c which illustrate diagrammatically the power and control circuits. These figures correspond respectively to Figures 24a, 24b and 24c of the aforementioned patent to Dunn and Larson. The alterations made in the wiring diagram of the system of that patent to illustrate an application of the invention thereto are shown in Figure 7a. It will be noted that a new switch GK has been added. This switch serves as a field boosting switch, a stop initiating switch and a notch back switch, field boosting switch FB being omitted and the notch back function of switch Z being eliminated. Switch GK is a latching switch of the type which is held in by residual magnetism. Its operating coil is designated GKO and its reset coil is designated GKR. The switch has five pairs of contacts designated GK1, GK2, GK3, GK4 and GK5. The operating coil is controlled by an additional pair of contacts operated by lever 736 (see Figure 2) upon energization of operating coil 577 of stop magnet SM, these contacts being designated SM1. The reset coil GKR is subject to cams 930 and 931 and roller 933 of the stop initiating mechanism. Cam 930 is subject to down direction switch contacts PD1 so as to be rendered alive upon operation of switch GK to engage contacts GK5 when the car is set for downward travel. Similarly cam 931 is subject to contacts PU1 of the up direction switch so as to be rendered alive upon operation of switch GK when the car is set for upward travel. Designations of the generator field control resistance steps have been changed owing to the rearrangement of the control of these steps. These steps are now designated R1, R2, R3, R4, R5, R6 R7, R8, R9 and R10.

Assume that the car is positioned at the first floor and is set for upward travel. Thus contacts PU216, PU281 and PU1 are engaged. Assume that the starting switch is moved to full start position to start the car. In this position, starting switch contacts 531 are bridged completing the circuit for the operating coil SM577 of the stop magnet. The stop magnet acts to retract the pawls and engages the four pairs of switch contacts operated by lever 736 including contacts SM1 and SM586. The engagement of contacts SM1 completes the circuit for the operating coil of switch GK. Switch GK upon operation engages contacts GK1, GK2 and GK3 to short circuit resistance steps R3 (resistance step R9 being short circuited by contacts Q232), R6 and R5 and separates contacts GK4 to remove the short circuit for resistance step R1. This conditions the generator field control resistance for the starting operation. Switch GK also engages contacts GK5 to connect cam 931 through the reset coil of switch GK to the + line, rendering this cam alive. The engagement of contacts SM586 completes the circuit for coil A585 of the first auxiliary stopping relay. Relay A separates contacts A524 to open the circuit to the hall light brushes 519 and 523, breaking the circuit for the up hall lantern 521 at the first floor which was lighted under the conditions assumed. Relay A also engages contacts A594 which together with the bridging of start switch contacts 597 completes the circuit for the advancer motor, this circuit being through armature 589 and field winding 588, connected in parallel by contacts PU591, and field winding 590. The advancer motor operates to close selector switches 102, 57, 121, 131, 154 and 162 and advance the carriage. As the carriage advances, roller 933 engages cam 930 to swing plate 932 clockwise about its pivot as previously explained.

Upon operation of switches H and HG, the brake release coil is energized and the generator field winding is energized through contacts PU216 and PU281 in a direction to effect starting of the car in the up direction. Thereafter speed switches D, E, F and G operate in timed sequence to short circuit steps R1, R2, R3, R4 and R7 of the generator field control resistance, thereby increasing the generator excitation to bring the car up to full speed. The amount of resistance which is effective at starting due to the operation of switch GK is such as to cause acceleration to take place at the desired rate consistent with comfort and safety of the passengers. The speed switches are timed to operate and short circuit amounts of resistance so that this rate of acceleration is maintained. During movement of the car, plate 932 is swung about its pivot by movement of the crosshead to decrease the distance between roller 933 and cam 931 until the plate is brought to a stop. In this condition, cam 931 is in effect maximum stopping distance ahead of the car.

Assume that a call has been registered by the pressing of up push button 295 at the seventh floor. This causes the seventh floor relay to be operated and thus contacts 349 to be engaged. Assume further that the car attains a speed of 1000 f.p.m. under full speed operating conditions. A six floor run has been assumed so that the car will have reached substantially full speed before it arrives at the stop initiating point for the seventh floor. Upon arrival of the car 50 feet from the seventh floor, assuming that the stop collars 715 and 716 are set to permit a 50 foot carriage advance, brush 514 engages contact 427 rendered alive by the engagement of floor relay contacts 349. This establishes a circuit for coil SM548 of the stop magnet. This neutralizes coil SM577 releasing cam 730 and extending the pawls to permit up pawl 705 to engage the stopping lug for the seventh floor. The circuit for coil SM548 is through seventh floor relay reset coil 331 and contacts 349, bus bar UH7, contact 427, brush 514, contacts PA544, contacts NS545, resistance 546, contacts AS547, coil SM548 and contacts SM549. The release of the cam also effects the opening of contacts SM549, SM583, SM586 and SM1. The opening of contacts SM1 deenergizes the operating coil of switch GK. This switch is maintained latched in operated condition, however, by residual magnetism.

The opening of contacts SM549 and SM583 breaks the circuits for coils SM548 and SM577. The opening of contacts SM586 breaks the circuit for coil A585 of the first auxiliary stopping relay. This relay drops out, separating contacts A594 and engaging contacts A524 and A541. The separation of contacts A594 breaks the circuit for the advancer motor. The engagement of contacts A541 completes a circuit through brush 515 and contact 428 to effect the reset of the up seventh floor relay, this circuit extending through the reset coil 331 and contacts 349 of the relay, contacts PB539, contacts NS540 and resistance 542. Although a circuit was completed for reset coil 331 by the engagement of brush 514 with contact 427, the amount of current supplied to this coil through that circuit was not sufficient to cause the relay to be reset. The current supplied to this coil through the circuit completed through brush 515 and contact 428 by the engagement of contacts A541, however, is sufficient to reset the relay, which separates its contacts 349 and reengages its contacts 367.

The engagement of contacts A524 completes the circuit for the up hall lantern 433 at the seventh floor, this circuit being through contacts C376, contacts PB526, brush 523, contact 434 and contacts NS392. Thus under the assumed conditions the up hall lantern at the seventh floor is lighted when the car reaches a point fifty feet from the seventh floor, and before the car has started to slow down, providing a maximum duration of lighting.

As the car continues in motion, the up pawl 705 engages the lug for the seventh floor, bringing the sliding carriage 703 to a stop. Brush 523 is still engaged with contact 434 at this time so that the up hall lantern at the seventh floor is maintained lighted. Upon the carriage being stopped, upward movement of roller 933 is stopped. Upward movement of the crosshead continues, however, and upon engagement of cam 931 with roller 933 a circuit is completed for the reset coil of switch GK, causing the switch to be dropped out. Thus contacts GK1 separate to insert step R8 (and also step R9 if load magnet contacts Q232 are separated) of the generator field control resistance in circuit with the generator field winding to initiate stopping of the car. Inasmuch as a full speed run is being assumed, this causes the car to start slowing down.

As the car continues its movement, a point is reached at which selector switch 162 opens to deenergize coil G160 of fourth speed switch G. Thus contacts G221 separate to insert resistance steps R7 and R6 in circuit with the generator field winding, contacts GK2 being separated. As the car reaches a point still closer the floor at which the stop is being made, selector switch 154 opens to deenergize coil F152 resulting in the separation of contacts F222 to insert resistance steps R5 and R4 in circuit with the generator field winding, contacts GK3 being separated. As the car reaches a point still closer to the floor, selector switch 131 opens to deenergize coil E127 of the second speed switch causing the separation of contacts E223 to insert resistance step R3 in circuit with the generator field winding. As the car reaches a point still closer to the floor, selector switch 121 opens to deenergize coil D117 of the first speed switch causing the separation of contacts D224 to insert resistance step R2 in circuit with the generator field winding, contacts GK4 being in engagement short circuiting resistance step R1. Thus as these selector switches open in sequence the strength of the generator field winding is gradually decreased to slow down the elevator car to a slow speed. Upon the opening of selector switch 102 the levelling mechanism takes over the operation to bring the car to a stop level with the floor. As these operations take place roller 933 remaining stationary holds cam 931 against further upward movement so that continued upward movement of the crosshead causes plate 932 to be returned to neutral position.

Assume that the operating conditions are such that a call is picked up before the carriage reaches fully advanced position. The hall lantern is lighted as soon as the call is picked up as above explained. Assume further that the length of the run involved is such that switch G is not operated and contacts G221 are not engaged. Thus upon the engagement of cam 931 with roller 933 to cause the dropping out of switch GK, contacts GK1 and GK2 separate to insert resistance steps R8 and R6 in circuit with the generator field winding. This changes the system from a state of acceleration to a state of retardation, effecting this transition at a rate consistent with comfort and safety of passengers and so that smooth retardation is obtained as selector switches 154, 131, 121 and 102 open as the car continues its movement toward the floor at which a stop is being made.

A similar condition exists when the length of the run is so short that switch F is not operated and contacts F222 are not engaged at the time cam 931 engages roller 933 to initiate the stopping operation. Thus switch GK in dropping out and separating contacts GK1, GK2 and GK3 inserts resistance steps R8, R6 and R5 to initiate the stopping operation. This as before changes the system from a state of acceleration to a state of retardation. Thus the more resistance that is already in circuit with the generator field winding at the time switch GK drops out, the greater the amount of resistance inserted by GK in dropping out in order that the amount of change in generator excitation may be made substantially the same.

A similar operation is had when the car is set for downward travel. Under such conditions contacts PD217, PD289 and PD1 are engaged. Upon the engagement of contacts SM1 as a result of the operation of the starting switch, coil GKO is energized to cause the operation of switch GK. Switch GK operates as previously described to condition the generator field control resistance for the starting operation. It also connects cam 930 through the reset coil of switch GK to the + line. Also the operation of the stopping magnet causes operation of relay A which as switch PD is operated completes the circuit for the advancer motor for rotation in the opposite direction to close the selector switches and advance the carriage downwardly. As the carriage advance takes place roller 933 engages cam 931 to swing plate 932 counterclockwise about its pivot. Upon operation of switches H and G the brake release coil is energized and the generator field winding is energized through contacts PD280 and PD217 to effect starting of the car in the downward direction. Thereafter speed switches D, E, F and G operate in timed sequence to short circuit steps R1, R2, R3, R4 and R7 of the generator field control resistance, thereby increasing the generator excitation to bring the car up to full speed. During movement of the car, plate 932 is further swung about its pivot to decrease the distance between roller 933 and cam 930.

When a call is picked up stop magnet SM is deenergized to extend the pawls, to cause the lighting of the proper hall lantern and to cause the opening of contacts SM1 and thus deenergize the operating coil of switch GK. Upon the down pawl engaging the stop collar for the floor at which a stop is to be made downward movement of roller 933 is stopped. Downward movement of the crosshead continues, however, and upon engagement of cam 930 with roller 933 a circuit is completed for the reset coil of switch GK causing this switch to be dropped out. Thus contacts GK1 separate to insert resistance step R8 in circuit with the generator field winding to initiate slowing down of the car. Thereafter the selector switches are opened in sequence to drop out the speed switches and thus cause further steps of generator field control resistance to be inserted in circuit with the generator field winding to further slow down the car and finally to effect the transfer of the control to the levelling mechanism to bring the car to a stop at the landing level.

Roller 933 remaining stationary holds cam 930 against further downward movement so that continued downward movement of the crosshead returns plate 932 to neutral position. On short runs where one or more of the speed switches have not operated by the time switch GK is dropped out to initiate the stopping operation a larger amount of resistance is inserted in circuit with the generator field winding to obtain the desired operation as above set forth.

It is to be understood that the invention may be used in connection with apparatus and circuits different from those described and also in connection with different forms of elevator control and with other forms of motor control. Also the stop initiating mechanism may be applied to other forms of selector machines and to other mechanisms actuated in accordance with car movement. Variations in the construction of the stop initiating mechanism may be made, although the construction shown in the drawings has various advantages including its ready adaptability to installations of different speeds. The construction may be simplified where the use of the mechanism is restricted to certain types of installations. The rotary movement of plate 932 by the sprocket and chain is utilized to obtain the desired contact advance on high speed installations with a restricted carriage advance. However, for installations where the car can get up to full speed on a run of somewhat less than the maximum carriage advance and provided the relatively long call pick up distance would not be objectionable, this rotary feature may be omitted and the mechanism arranged so that the alive cam will be advanced by the roller to a position which is the desired stopping distance ahead of the floor at which a stop is to be made, regardless of the length of the run. Also, in certain installations, movement of the cams may be effected entirely by car movement.

Therefore, as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination; an elevator car; a plurality of landings served by the car; car actuating and stopping mechanism; means for causing operation of said mechanism to start the car; a pair of members movable in accordance with movement of the car; means for advancing one of said members with respect to the other incident to the starting of the car; means operable either during the advance of said one member or subsequent movement thereof in accordance with car movement to cause said one member to be brought to a stop preparatory to stopping the car at one of said landings; and circuit controlling means carried part on said one member and part on said other member operable when said one member has been stopped to thereafter cause stopping of the car by said mechanism to be initiated.

2. In combination; an elevator car; a plurality of landings served by the car; car actuating and stopping mechanism; means for causing operation of said mechanism to start the car; a pair of members movable in accordance with movement of the car; means for advancing one of said members with respect to the other incident to the starting of the car; means operable either during the advance of said one member or subsequent movement thereof in accordance with car movement along with said other member to cause said one member to be brought to a stop preparatory to stopping the car at a landing; a contact carried by said one member; and a contact carried by said other member adapted upon continued movement of said other member, when said one member has been stopped, to engage the first named contact to cause stopping of the car by said mechanism to be initiated.

3. In combination; an elevator car; a plurality of landings served by the car; car actuating and stopping mechanism; means for causing operation of said mechanism to start the car; a member movable in accordance with movement of the car; a second member movable to advanced position with respect to the first member incident to the starting of the car and thereafter movable in its advanced position along with said first member in accordance with car movement; means operable either during the advance of said second member or subsequent movement thereof in accordance with car movement to cause said second member to be brought to a stop preparatory to stopping the car at any one of said landings; and circuit controlling means carried part on said second member and part on said first member operable after stopping of said second member and upon arrival of the car at a distance, determined by the length of the run, in advance of the landing at which the stop is to be made to cause stopping of the car by said mechanism to be initiated.

4. In combination; an elevator car; a plurality of landings served by the car; car actuating and stopping mechanism; means for causing operation of said mechanism to start the car; a member movable in accordance with movement of the car; a second member movable to advanced position with respect to the first member incident to the starting of the car and thereafter movable in its advanced position along with said first member in accordance with car movement; a plurality of stationary means, one for each of said landings; means carried by said second member for cooperation with any one of said stationary means either during the advance of said second member or subsequent movement thereof in accordance with car movement to cause said second member to be brought to a stop; and circuit controlling means carried part on said second member and part on said first member operable after stopping of said second member and upon arrival of the car at a distance, determined by the length of the run, in advance of the landing for which a stationary means has cooperated in causing said second member to be brought to a stop to cause stopping of the car by said mechanism to be initiated.

5. In combination; an elevator car; a plurality of landings served by the car; car actuating and stopping mechanism; means for causing operation of said mechanism to start the car; a member movable in accordance with movement of the car; a second member movable to advanced position with respect to the first member incident to the starting of the car and thereafter movable in its advanced position along with said first member in accordance with car movement; means operable either during the advance of said second member or subsequent movement thereof in accordance with car movement to cause said second member to be brought to a stop preparatory to stopping the car at a landing; a contact carried by said second member; a contact carried by said first member operable by relative movement of said members into position to engage the first named contact upon continued movement of said first member after said second member has been stopped as the car arrives at a distance from such landing which up to a full speed run varies in accordance with the length of the run; and means responsive to said engagement of said contacts for causing stopping of the car by said mechanism to be initiated.

6. In combination; an elevator car; a plurality of landings served by the car; car actuating and stopping mechanism; means for causing operation of said mechanism to start the car; a member movable in accordance with movement of the car; a second member movable to advanced position with respect to the first member incident to the starting of the car and thereafter movable in its advanced position along with said first member in accordance with car movement; a plurality of stationary means, one for each of said landings; circuit controlling means for each stationary means; means carried by said second member for cooperation with said stationary means and adapted upon cooperation with a stationary means for a landing for which circuit controlling means has been operated to cause said second member to be brought to a stop; contacting means carried by said second member; and cooperating contacting means carried by said first member and operable by movement of said members into position to engage the first named contacting means upon arrival of the car at a distance which is a function of the length of the run, in advance of the landing for which a stationary means has cooperated to cause said second member to be brought to a stop to initiate stopping of the car by said mechanism.

7. In combination; an elevator car; a plurality of landings served by the car; car actuating and stopping mechanism; means for causing operation of said mechanism to start the car; a member movable in accordance with movement of the car, said member having a reference point corresponding to the position of the car; a second member movable to advanced position with respect to the first member incident to the starting of the car and thereafter movable in its advanced position along with said first member in accordance with car movement; a contact carried by said second member; means operable either during the advance of said second member or subsequent movement thereof in accordance with car movement to cause said second member to be brought to a stop with said contact in position with respect to said reference point on said first member corresponding to the position of a landing at which a stop is to be made with respect to the position of the car; contacting means carried by said first member and movable thereon for engaging said contact after said second member has been stopped; means including said contact for moving said contacting means into position, by the time said contacting means engages said contact, a distance in advance of said reference point on said first member determined by the length of the run; and means responsive to said engagement of said contacting means with said contact for causing stopping of the car by said mechanism to be initiated.

8. In combination; an elevator car; a plurality of landings served by the car; car actuating and stopping mechanism; means for causing operation of said mechanism to start the car; a member movable in accordance with movement of the car, said member having a reference point corresponding to the position of the car; a second member movable to advanced position with respect to the first member incident to the starting of the car and thereafter movable in its advanced position along with said first member in accordance with car movement; a contact carried by said second member; means operable either during the advance of said second member or subsequent movement thereof in accordance with car movement to cause said second member to be brought to a stop, preparatory to stopping the car at a landing, with said contact in position with respect to said reference point on said first member corresponding to the position of such landing with respect to the position of the car; contacting means carried by said first member and movable thereon comprising two contacting elements, one ahead of and one behind said contact in the path of movement thereof, so as to cause the contacting element behind said contact to engage the contact after said second member has been stopped; means for moving said contacting means into position such that at the time said behind contacting element engages said contact it is a distance in advance of said reference point on said first member corresponding to stopping distance for the car for the particular length of the run, at least a portion of such movement being effected by said contact engaging and moving the contacting element ahead during the advance of said second member; and means responsive to said engagement of said behind contacting element with said contact for causing stopping of the car by said mechanism to be initiated.

9. In combination; an elevator car; a plurality of landings served by the car; car actuating and stopping mechanism; means for causing operation of said mechanism to start the car; a member movable in accordance with movement of the car; a second member movable to advanced position with respect to the first member incident to the starting of the car and thereafter movable in its advanced position along with said first member in accordance with car movement; means operable either during the advance of said second member or subsequent movement thereof in accordance with car movement to cause said second member to be brought to a stop, preparatory to stopping the car at a landing; a contact carried by said second member; contacting means carried by said first member and movable with respect thereto comprising a pair of contacting elements positioned one ahead of and one behind said contact in the path of movement thereof, so that the contacting element ahead of said contact is engaged thereby during the advance of said second member to move said contacting means with respect to said first member and so that said contact is engaged by the contacting element behind it upon continued movement of said first member after said second member has been stopped; means for rendering only said contacting element behind said contact alive during such movement of said members; and means responsive to said engagement of said behind contacting element with said contact for causing stopping of the car by said mechanism to be initiated.

10. In combination; an elevator car; a plurality of landings served by the car; car actuating and stopping mechanism; means for causing operation of said mechanism to start the car; a member movable in accordance with movement of the car; a second member movable to advanced position with respect to the first member incident to the starting of the car and thereafter movable in its advanced position along with said first member in accordance with car movement; means operable either during the advance of said second member or subsequent movement thereof in accordance with car movement to cause said second member to be brought to a stop; a contact roller carried by said second member; contacting means carried by said first member and pivotally movable with respect thereto comprising a pair of angularly spaced contacting cams spanning said contact roller and in the path of movement thereof so that the contacting cam ahead of said contact roller is engaged thereby during the advance of said second member to pivotally move said contacting means on said first member to alter the position of the contacting element behind the contact roller with respect to said contact roller; means for rendering only said contacting cam behind said contact roller alive during such movement of said members; and means responsive to said engagement of said behind contacting cam with said contact roller after said second member has been stopped for causing stopping of the car by said mechanism to be initiated.

11. In combination; an elevator car; a plurality of landings served by the car; car actuating and stopping mechanism; means for causing operation of said mechanism to start the car; a member movable in accordance with movement of the car, said member having a reference line corresponding to the position of the car; a second member movable to advanced position with respect to the first member incident to the starting of the car and thereafter movable in its advanced position along with said first member in accordance with car movement; a contact roller carried by said second member, said roller being opposite said reference line prior to the advance of said second member; means operable either during the advance of said second member or subsequent movement thereof in accordance with car movement to cause said second member to be brought to a stop with said roller in position with respect to said reference line corresponding to the position of a landing at which a stop is to be made with respect to the car; contacting means rotatably mounted on said first member on said reference line comprising a pair of angularly spaced contacting cams positioned one ahead of and one behind said roller and in the path of movement thereof so that the contacting cam ahead of said roller is engaged thereby during the advance of said second member to rotate said contacting means to alter the position of the contacting cam behind the roller with respect to said roller; means operable by car movement for further rotating said contacting means to bring said contacting cam behind said roller into position to engage said roller after said second member has been stopped upon the arrival of the car stop initiating distance from the landing at which the stop is to be made; means for rendering only said contacting cam behind said roller alive during such movement of said members; and means responsive to said engagement of said behind contacting cam with said roller for causing stopping of the car by said mechanism to be initiated.

12. In combination; an elevator car; a plurality of landings served by the car; car actuating and stopping mechanism; means for causing operation of said mechanism to start the car; a member movable in accordance with movement of the car; a second member movable to advanced position with respect to the first member prior to the starting of the car and movable in its advanced position along with said first member in accordance with car movement when the car has been started; means operable either during the advance of said second member or subsequent movement thereof in accordance with car movement to cause said second member to be brought to a stop in position with respect to said first member corresponding to the position of a landing at which a stop is to be made; a pivot shaft carried by said first member; a contact roller carried by said second member aligned with said shaft prior to the advance of said second member; a plate rotatably mounted on said shaft; a pair of angularly spaced contacting cams carried by said plate and oppositely disposed on each side of a line through said shaft and roller prior to the advance of said second member and extending into the path of movement of said roller so that the contacting cam ahead of said roller is engaged thereby during the advance of said second member to rotate said plate to alter the position of the contacting cam behind the roller with respect to said roller; a stationary sprocket chain extending along the path of movement of said first member; a sprocket wheel meshing with said chain and connected to said plate to effect further rotative movement thereof during initial car movement; means for stopping rotative movement of said plate when said contacting cam behind said roller has reached a position with respect to said roller a distance ahead of said horizontal line corresponding to stop initiating distance for the car from full speed; and means responsive to said roller in the stopped position of said second member being engaged by said cam behind said roller either during said further rotative movement of said plate or after such rotative movement has been stopped, depending upon the length of the run, for causing stopping of the car by said mechanism to be initiated.

13. In combination; an elevator car; a plurality of landings served by the car; car actuating and stopping mechanism; means for causing operation of said mechanism to start the car; a member vertically movable in accordance with movement of the car; a second member movable to advanced position with respect to the first member prior to the starting of the car and movable in its advanced position along with said first member in accordance with car movement when the car has been started; a motor for advancing said second member; means operable either during the advance of said second member or subsequent movement thereof in accordance with car movement to cause said second member to be brought to a stop in position with respect to said first member corresponding to the position of a landing at which a stop is to be made; a pivot shaft carried by said first member; a contact roller carried by said second member and positioned when the car is at rest at a landing on a horizontal line through said shaft, said roller being horizontally adjustable on said line toward and away from said first member; a plate rotatably mounted on said shaft; a pair of angularly spaced opposite cams carried by said plate, one on each side of said horizontal line, said cams being angularly adjustable with respect to said line and extending into the path of movement of said roller so that the cam ahead of said roller is engaged thereby during the advance of said second member to rotate said plate to alter the position of the cam behind the roller with respect to said roller; a stationary sprocket chain extending along the path of movement of said first member; a clutch carried by said first member; a sprocket wheel carried by said first member for meshing with said chain; means connecting said sprocket wheel through said clutch to said plate to effect further rotative movement thereof upon starting of the car; adjustable means for stopping rotative movement of said plate when said cam behind said roller has reached a position with respect to said roller a distance ahead of said horizontal line corresponding to stopping distance for the car from full speed; and means responsive to the engagement of said cam behind said roller, either during said further rotative movement of said plate or after such rotative movement has been stopped, with said roller after said second member has been stopped for causing stopping of the car by said mechanism to be initiated.

14. In combination; an elevator car; a plurality of landings served by the car; car actuating and stopping mechanism; means for causing operation of said mechanism to start the car; a member movable in accordance with movement of the car; a second member movable to advanced position with respect to the first member incident to the starting of the car and movable in advanced position along with said first member in accordance with car movement when the car is started; means operable either during the advance of said second member or subsequent movement thereof in accordance with car movement to cause said second member to be brought to a stop preparatory to stopping the car at a landing; a contact carried by said second member; a contact carried by said first member adapted upon continued movement of said first member when said second member has been stopped to engage the first named contact upon arrival of the car at stop initiating distance in advance of the landing at which the stop is to be made to initiate stopping of the car; and means operable by continued movement of said first member after initiation of the stopping operation for controlling in steps the operation of said mechanism as the car arrives at decreasing distances from the landing at which the stop is being made to slow down the car.

15. In combination; an elevator car; a plurality of landings served by the car; car actuating and stopping mechanism; means for causing operation of said mechanism to start the car; a member movable in accordance with movement of the car; a second member movable to advanced position with respect to the first member incident to the starting of the car and movable in advanced position along with said first member in accordance with car movement when the car is started; means operable either during the advance of said second member or subsequent movement thereof in accordance with car movement to cause said second member to be brought to a stop in position with respect to said first member corresponding to the position of a landing at which a stop is to be made; contacting means carried by said second member; cooperating contacting means carried by said first member and operable by movement of said members into position to engage the first named contacting means upon arrival of the car at a distance in advance of the landing at which the stop is to be made determined by the length of the run to thereupon initiate stopping of the car; and means operable upon continued movement of the car after initiation of the stopping operation for controlling in steps the operation of said mechanism as the car arrives at decreasing distances from the landing at which the stop is being made to slow down the car.

16. In combination; an elevator car; a plurality of landings served by the car; car actuating and stopping mechanism; means for causing operation of said mechanism to start the car; a movable member; means for moving said member in accordance with movement of the car; a second member relatively movable with respect to the first member; means for advancing said second member with respect to said first member incident to the starting of the car and for thereafter moving it in its advanced position along with said first member in accordance with car movement; a plurality of circuit controlling means, one for each of said landings for registering calls for the respective landings; means carried by said second member and operable during the advance thereof or subsequent movement thereof in accordance with car movement to pick up calls that are registered; means for each of said landings operable when a call is picked up to bring said second member to a stop; contacting means carried by said second member; cooperating contacting means carried by said first member and operable by movement of said members into position to engage the first named contacting means upon arrival of the car at a distance in advance of the landing for which a call has been picked up determined by the length of the run to thereupon initiate stopping of the car; a plurality of switches; and means operable upon continued movement of the car after initiation of the stopping operation for successively operating said switches as the car arrives at decreasing distances from the landing at which the stop is being made to cause operation of said mechanism to bring the car down to a slow speed from which it may be brought to a stop.

17. In combination; an elevator car; a plurality of landings served by the car; car actuating and stopping mechanism; means for causing operation of said mechanism to start the car; a movable member; means for moving said member in accordance with movement of the car; a plurality of switches carried by said member; a second member relatively movable with respect to the first member; means comprising a motor carried by said first member for closing said switches and for advancing said second member with respect to said first member prior to the starting of the car, said motor thereafter acting to maintain said second member in its advanced position for movement along with said first member in accordance with car movement; a plurality of circuit controlling means, one for each of said landings for registering calls for the respective landings; means carried by said second member and operable during the advance thereof or subsequent movement thereof in accordance with car movement to pick up calls that are registered; means for each of said landings operable when a call is picked up to bring said second member to a stop; contacting means carried by said second member; cooperating contacting means carried by said first member and operable by movement of said members into position to engage the first named contacting means upon arrival of the car at a distance in advance of the landing for which a call has been picked up determined by the length of the run to thereupon initiate stopping of the car; and means operable upon continued movement of the car after initiation of the stopping operation for successively opening said switches as the car arrives at decreasing distances from the landing at which the stop is being made, one or more of which distances may be greater than the distance of a one floor run, to cause operation of said mechanism to bring the car down to a slow speed from which it may be brought to a stop.

18. In combination; an elevator car; a plurality of landings served by the car; car actuating and stopping mechanism; means for causing operation of said mechanism to start the car; a movable member; means for moving said member in accordance with movement of the car; a second member relatively movable with respect to the first member; means for advancing said second member with respect to said first member prior to the starting of the car and for moving it in its advanced position along with said first member in accordance with car movement when the car is started; a plurality of circuit controlling means, one for each of said landings for registering calls for the respective landings; a hall lantern at each of said landings; means carried by said second member and operable during the advance thereof or subsequent movement thereof in accordance with car movement to pick up calls that are registered and to cause lighting of the hall lanterns at the landings for which calls are picked up; means for each of said landings operable when a call is picked up to bring said second member to a stop; contacting means carried by said second member; and cooperating contacting means carried by said first member and operable by movement of said members into position to engage the first named contacting means upon arrival of the car a distance in advance of the landing for which a call has been picked up determined by the length of the run to initiate stopping of the car.

19. In combination; an elevator car; a plurality of landings served by the car; car actuating and stopping mechanism; means for causing operation of said mechanism to start the car; a movable member; means for moving said member in accordance with movement of the car; a second member relatively movable with respect to the first member; means for advancing said second member with respect to said first member incident to the starting of the car and for thereafter moving it in its advanced position along with said first member in accordance with car movement; a plurality of circuit controlling means, one for each of said landings for registering calls for the respective landings; a hall lantern at each of said landings; means carried by said second member and operable during the advance thereof or subsequent movement thereof in accordance with car movement to pick up calls that are registered and to cause lighting of the hall lanterns at the landings for which calls are picked up; means for each of said landings operable when a call is picked up to bring said second member to a stop; contacting means carried by said second member; cooperating contacting means carried by said first member and operable by movement of said members into position to engage the first named contacting means upon arrival a distance in advance of the landing for which a call has been picked up determined by the length of the run to thereafter initiate stopping of the car; a plurality of switches; and means operable upon continued movement of the car after initiation of the stopping operation for successively operating said switches as the car arrives at decreasing distances from the landing at which the stop is being made to cause operation of said mechanism to bring the car down to a slow speed from which it may be brought to a stop.

DAVID CARL LARSON.